United States Patent
Barajas Gonzalez et al.

(10) Patent No.: US 9,495,106 B2
(45) Date of Patent: *Nov. 15, 2016

(54) DEDUPLICATION TRACKING FOR ACCURATE LIFESPAN PREDICTION

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,484

(22) Filed: May 23, 2016

(65) Prior Publication Data

US 2016/0266820 A1    Sep. 15, 2016

Related U.S. Application Data

(63) Continuation of application No. 14/603,706, filed on Jan. 23, 2015, now Pat. No. 9,372,628.

(51) Int. Cl.
*G06F 3/00* (2006.01)
*G06F 12/00* (2006.01)
*G06F 3/06* (2006.01)

(52) U.S. Cl.
CPC ........... *G06F 3/0616* (2013.01); *G06F 3/0608* (2013.01); *G06F 3/0641* (2013.01); *G06F 3/0649* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 7,747,813 B2 | 6/2010 | Danilak | |
| 8,339,881 B2 | 12/2012 | Danilak | |
| 8,463,983 B2 | 6/2013 | Eleftheriou et al. | |
| 2011/0258363 A1 | 10/2011 | Doatmas et al. | |
| 2012/0124282 A1 | 5/2012 | Frank et al. | |
| 2013/0036277 A1 | 2/2013 | Szczepkowski et al. | |
| 2013/0179631 A1* | 7/2013 | Cepulis | G06F 3/0616 |
| | | | 711/103 |
| 2014/0297926 A1 | 10/2014 | Ono | |

OTHER PUBLICATIONS

"NAND Evolution and its Effects on Solid State Drive (SSD) Useable Life," White Paper, Western Digital Technologies, Inc., WP-001-01R, 2009 (16 pages).

Lee et al., "An Integrated Approach for Managing the Lifetime of Flash-Based SSDs," EDAA, 2013 (4 pages).

(Continued)

*Primary Examiner* — David X Yi
*Assistant Examiner* — Craig Goldschmidt
(74) *Attorney, Agent, or Firm* — Griffiths & Seaton PLLC

(57) ABSTRACT

Various embodiments for predicting hardware lifespan by a processor device are provided. For a solid state drive (SSD) device configured with data deduplication mechanisms, trend information is obtained by comparing a write tracking table to a de-duplicated cell tracking table to determine how many new cells were allocated on the SSD device over a particular time period. The trend information is applied to at least one drive constant data to predict the useful remaining lifespan of the SSD drive device.

21 Claims, 4 Drawing Sheets

(56) References Cited

OTHER PUBLICATIONS

Kim et al., "Deduplication in SSDs: Model and Quantitative Analysis," Proc. International Conference on Mass Storage Systems and Technologies, 2012, IEEE, 2013 (12 pages).

Lee et al., "Lifetime Management of Flash-Based SSDs using Recovery-Aware Dynamic Throttling," FAST, 2012 (14 pages).

Ha et al., "Deduplication with Block-Level Content-Aware Chunking for Solid State Drives (SSDs)," 2013 IEEE Intenational Conf. on High Performance Computing and Communications & 2013 IEEE International Conf. on Embedded and Ubiquitous Computing, IEEE Computer Society, 2013 (8 pages).

* cited by examiner

DEDUPLICATION TRACKING FOR ACCURATE LIFESPAN PREDICTION

CROSS-REFERENCE TO RELATED APPLICATIONS

This Application is a Continuation of U.S. patent application Ser. No. 14/603,706, filed Jan. 23, 2015, the contents of which are hereby incorporated by reference.

BACKGROUND OF THE INVENTION

1. Field of the Invention

The present invention relates in general computing systems, and more particularly to, various embodiments for estimating hardware lifespan in computing environments.

2. Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be DE-duplicated using standard deduplication techniques so long as specific metrics are met. In addition, Solid State Drive (SSD) technology has recently taken a substantial foothold in the realm of modern day storage.

SUMMARY OF THE INVENTION

Various deduplication techniques may be used to deduplicate files. For example, the file may be analyzed against an additional file to determine if the file has the same size, name, and contents when analyzed at the block-by-block level. Deduplication technology allows, at a high level, the elimination of duplicate information in storage environments, such that the storage held by the duplicate information is then released, opening up potentially significant amounts of additional storage space in the computing storage environment. While deduplication has increased storage capacity, SSD technology has increased storage performance, as latencies are reduced and storage operations such as writes and reads take shorter amounts of time to complete.

While SSD technology generally allows for faster, smaller, quieter, and more durable devices, inherent within the SSD technology lies the challenge of longevity; SSD devices essentially will wear out with use over time. This challenge with SSD devices means that each cell in a flash memory bank has a limited number of times that the bank may be written to and erased. Accordingly, if a SSD is deployed to a high-write input/output (I/O) environment (such as a large shared storage area network (SAN)), the drive will, over time, begin to wear out, and in some cases, wear out quickly.

In addition, each progressive advancement in SSD/NAND flash technology has served to reduce the number of write cycles the cells can endure. Data deduplication can be employed in an environment such as SSD in order to effectively limit the amount of writes the SSD actually receives. However, when deduplication methodologies are used, the write-count or lifespan of the particular drive may come into question, as it becomes more difficult to accurately estimate exactly what physical operations have taken place on the drive. For example, questions may arise such as, "Did this drive receive 100% of its allowed writes, and should a replacement be prepared, or did the drive receive 20% of its allowed writes because technically the actual storage environment implements data deduplication at a 5 to 1 ratio?"

With the advancements in NAND flash technology, data deduplication becomes increasingly important to be conjunctively used; however new levels of uncertainty are introduced, as traditional methods of tracking SSD utilization become more obscured. This level of increasing uncertainty makes planning for future expenses and administering, for example, a large data center with hundreds or thousands of devices, a more difficult endeavor. Accordingly, a need exists for an accurate way to ascertain hardware lifespan in cases where deduplication functionality is implemented.

Accordingly, various embodiments for predicting hardware lifespan by a processor device are provided. For a solid state drive (SSD) device configured with data deduplication mechanisms, trend information is obtained by comparing a write tracking table to a de-duplicated cell tracking table to determine how many new cells were allocated on the SSD device over a particular time period. The trend information is applied to at least one drive constant data to predict the useful remaining lifespan of the SSD drive device.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
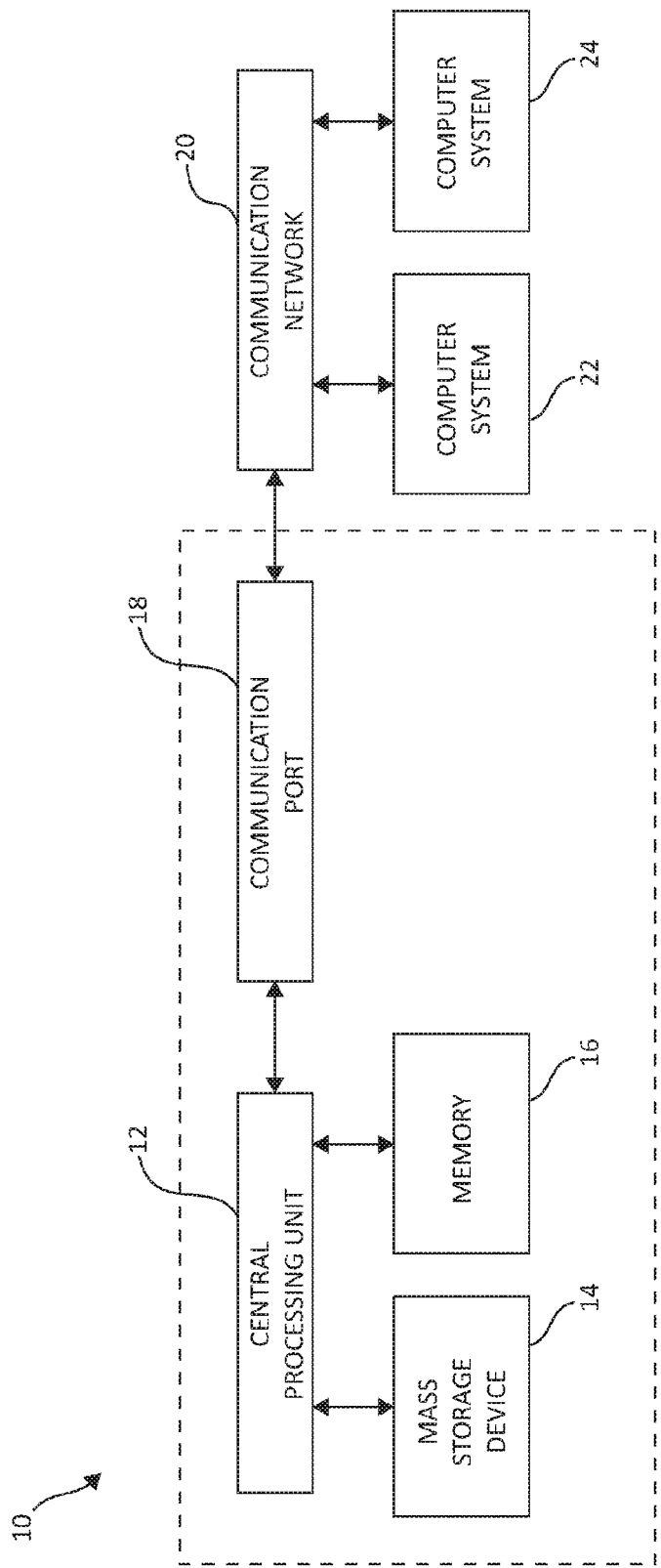
FIG. 1 is an exemplary block diagram showing a hardware structure for performing data deduplication and hardware lifespan prediction functionality, in which aspects of the present invention may be realized.

As previously mentioned, while attendant benefits result from the implementation of SSD devices in various storage environments, particularly when coupled with deduplication technology, such as faster storage operations, smaller footprint, quieter operation, greater overall bandwidth and higher storage capacity, among other benefits, there remains the challenge of accurately estimating lifespan for SSD hardware due to the physical effects that deduplication functionality has on the hardware by reducing the overall storage operations performed to the device.

Because deduplication functionality may vary in direct proportion to the actual underlying data undergoing deduplication, the physical processes resulting on a device implemented with deduplication functionality may also vary. Furthermore, some kinds of data are highly deduplicative in nature, while others are not, as one of ordinary skill in the art will appreciate. Each of these factors, along with the physical constraints of the devices themselves as well as other factors attendant to the particular storage environment, varies the lifespan of a particular device.

To address these issues, among other challenges, the mechanisms of the illustrated embodiments, among other functionality, define and utilize key algorithms that allow for SSD devices, when implemented with data deduplication mechanisms, to have not only the device's total writes to-date still accounted for, but the device's total life span to be estimated with a high degree of certainty.

When data is deduplicated, a large portion of the typical writes to the particular SSD device would not be occurring. Instead, a pointer is inserted in place of what would be the rewritten data, directing to another storage location where the same data is physically stored. This change from physical data to a pointer is able to be taken into account in conjunction with the average use of the device to, according to the mechanisms of the illustrated embodiments, predict a realistic lifespan expectancy for the device.

Consider the following example. In a particular device implemented with certain deduplication functionality, a steady state deduplication ratio of 5 to 1 is reached. In this case, once the steady state is reached, if the user is achieving a deduplication ratio of 5 to 1, the drive is writing a fifth as much of the write operations physically to the drive as the Mean Time Between Failure (MTBF) is currently anticipating. To compensate, the mechanisms of the illustrated embodiments introduce methodologies which, among other features, serve to account for this deduplication on the disk, and adjust lifespan predictions accordingly.

As will be further described, the mechanisms of the illustrated embodiments implement various methodologies in order to accurately predict the lifespan of a deduplication-enhanced SSD device. Firstly, these mechanisms incorporate the use of a write cycle tracking table. In one embodiment, the write cycle tracking table may be implemented on a per-cell basis, such that the write cycles of every cell (e.g., 4 KB) is accounted for on an accurate basis. Next, for each allocated unit in the tracking table, such as an additional cell, the tracking table is increased accordingly. Additionally, for each unit (again, e.g., cell) included in the table, a corresponding time stamp is included.

The mechanisms of the illustrated embodiments also implement a deduplicated tracking table. Again, in one embodiment, the deduplicated tracking table may be implemented on a per-cell basis, such that the deduplicative activities of every cell are accounted for on an accurate basis. The deduplicated tracking table functions to store how many times deduplicated data is associated with, or identified to, a specific unit of the table (i.e., cell). In this manner, the deduplicated tracking table tracks the frequency of deduplicated write operations to the device on the per-unit basis.

For each deduplicated entry to the tracking table, a corresponding time stamp may be included. Furthermore, a spike detection for unusual write patterns (resulting from both highly deduplicable and non deduplicable data) may be logically included.

In a further embodiment, a salvaged cell tracking operation may be used, incorporating a counter system, to track every deduplicated unit write (here again, e.g., cell). In a still further embodiment, historical predictions of drive lifespan may be retained by the system and compared with current predictive information as will be further described. In one embodiment, this historical prediction retention functionality may vary. The predictive activity may be that information obtained hourly, and retained for the last 30 days, for example, and that information obtained daily and retained for the life of the device. In addition, other statistical information such as the number of hours that the device has been powered on may be retained for analysis.

In addition to the tracking tables for both actual and prevented writes (corresponding to active and deduplicated activity, respectively), other data such as necessary drive constants, which describe the physical characteristics of the device itself, as well as possibly the physical characteristics of the environment that the drive may find itself in, may be retained. Some exemplary drive constants may include manufacturer-provided cell endurance ratings, or a total overprovision amount of a particular drive.

Using various aspects previously described, the mechanisms of the illustrated embodiments carry an ability to accurately predict not only a total amount of writes remaining at all times, even with deduplication functionality active, but how long the particular drive will last in time standard based data analytics of actual use. By factoring in drive constants information, for example, it is possible to ascertain how many drive-writes the manufacturer has guaranteed from the beginning. The actual drive writes table may be compared with the prevented drive writes table to gain a clear picture on how many actual new drive units (e.g., cells) are being allocated on a particular drive at any given time.

Utilizing the information gained from comparing the various tracking tables, a trend may emerge that may now be applied to the drive constants information (along with other information, potentially) to determine the reasonable remaining lifespan of the drive. In addition, past predictive information may be compared against each other, and upon I/O activity in order to help plan for future activity. Additional capacity for wear leveling may also be determined to an accurate extent by way of salvage cell tracking.

The mechanisms of the illustrated embodiments may either be used by operating system level monitoring software, or may be built into the firmware of the device itself. These mechanisms, if applied within the device, also may allow for lifespan information and other useful counters via SMART data that may then be applied in multiple different environments, including in data center level storage devices.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
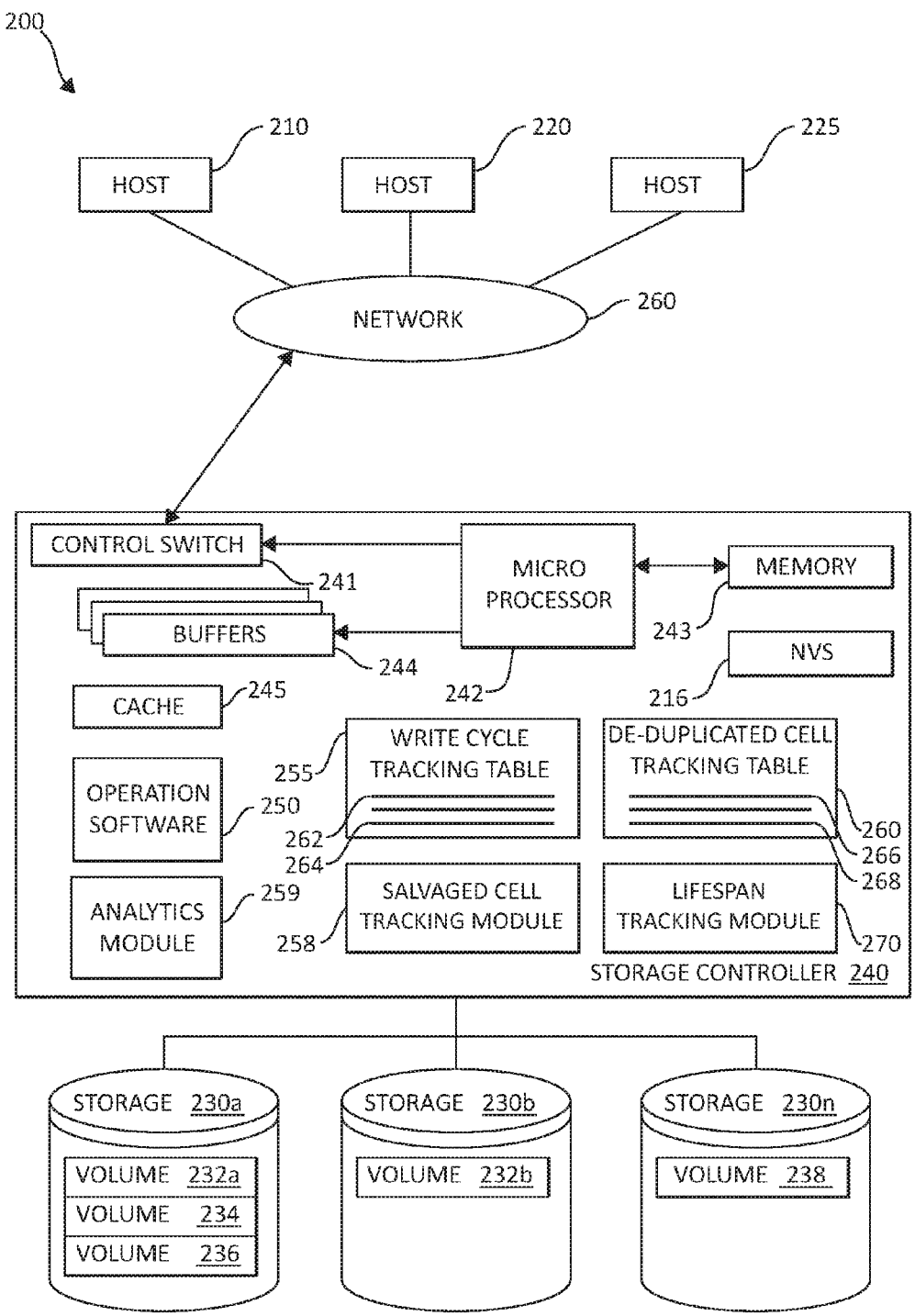
FIG. 2 is an exemplary block diagram showing a hardware structure of a data storage system in a computer system according to the present invention in which aspects of the present invention may be realized.

FIG. 2 is an exemplary block diagram 200 showing a hardware structure of a data storage and deduplication system that may be used in the overall context of performing video deduplication functionality. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of deduplication hardware and software, separately or in combination, may be utilized to implement the video deduplication functionality according to aspects of the illustrated embodiments. Moreover, it should be noted that particular deduplication system hardware and software may be useful in one embodiment, and thereby selected by one of ordinary skill in the art, where the recognition of two video streams having individual (differing) encoding codecs as the same video is desired.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a write cycle cell-tracking table 255, a salvaged cell-tracking module 258, an analytics module 259, a deduplicated cell-tracking table 260, and a lifespan tracking module 270. As shown, the write cycle cell-tracking table 255 may include entries 262 and 264. Similarly, the deduplicated cell-tracking table 260 may include entries 266 and 268 as shown.

The write cycle cell-tracking table 255, salvaged cell tracking module 258, analytics module 259, deduplicated cell-tracking table 260, and lifespan tracking module 270 may operate in conjunction with each and every component of the storage controller 240, the hosts 210, 220, 225, and storage devices 230. The write cycle cell-tracking table 255, salvaged cell tracking module 258, analytics module 259, deduplicated cell-tracking table 260, and lifespan tracking module 270 may be structurally or logically one complete module or may be associated and/or included with other individual modules. The write cycle cell-tracking table 255, salvaged cell-tracking module 258, analytics module 259, deduplicated cell-tracking table 260, and lifespan tracking module 270 may also be located in the cache 245 or other components.

The write cycle tracking table 255, salvaged cell tracking module 258, analytics module 259, deduplicated cell-tracking table 260, and lifespan tracking module 270 may individually and/or collectively perform various aspects of the present invention as will be further described. For example, the write-cycle tracking table 255 may perform various tasks relating to maintaining and tracking entries 262 and 264 of particular drive(s) in the table 255 as previously described. The deduplicated cell-tracking table 260 may work in a similar manner as the write cycle cell-tracking table 255 by maintaining deduplicated entries 266 and 268, thereby tracking prevented writes, again as previously described. The analytics module 259 may apply analytics to identify trends and correlate diagnostic, statistical, environmental, historical, and other information pertaining to a particular drive or the drive's environment to generate predictive information about the instant drive. The salvaged cell tracking module 258 may implement a salvaged cell-tracking operation as previously described. Finally, the lifespan tracking module 270 may implement various functionality such as retention of historical prediction information pertaining to particular drives, or a total number of hours powered on, for example.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the base-block generation module 257, the audio waveform module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
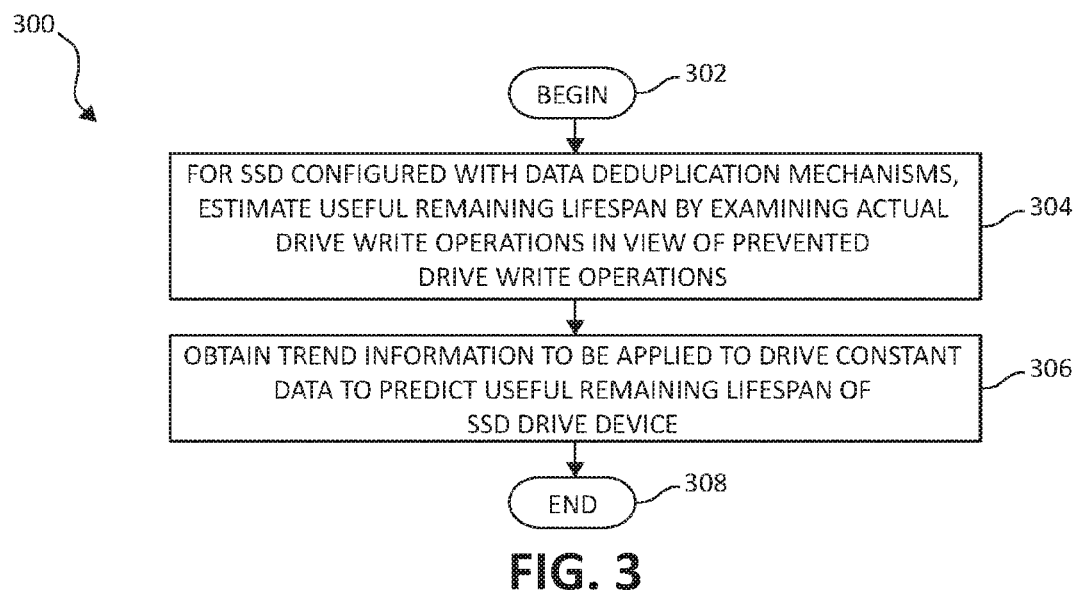
FIG. 3 is a flow chart diagram illustrating an exemplary method for predicting hardware lifespan, again in which aspects of the present invention may be realized.

Turning now to FIG. 3, a flow chart diagram, illustrating an exemplary method 300 for generating lifespan predictive information for hardware in a computing environment, is depicted. Method 300 begins (step 302). For one or more SSD's configured with data deduplication mechanisms, a useful remaining lifespan is estimated by examining actual drive write operations (made possible by examining the write cell-tracking table) in view of prevented drive write operations (made similarly possible by examining the deduplicated cell-tracking table) (step 304). Following the estimation of useful remaining lifespan, the method 300 obtains trend information to be applied to drive constant data to accurately predict a useful remaining lifespan of the SSD drive device (step 306). The method 300 then ends (step 306).

Figure 4:
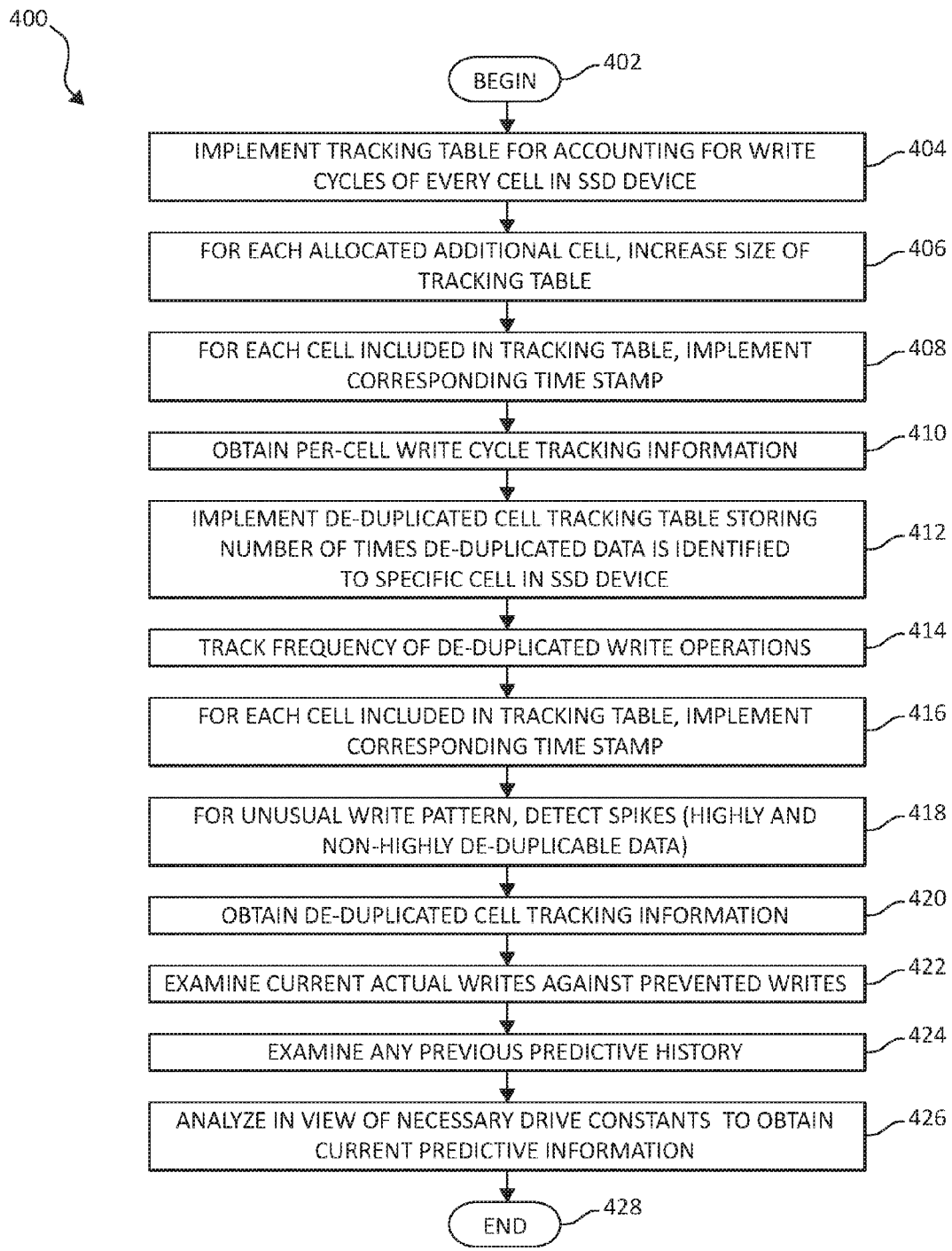
FIG. 4 is an additional flow chart diagram illustrating an additional exemplary method for predicting lifespan, again in which aspects of the present invention may be implemented.

FIG. 4, following, is an additional flow chart diagram depicting an exemplary method 400 for predicting useful remaining lifespan of various hardware in computing environments, here again in accordance with various aspects of the illustrated embodiments. In the depicted embodiment, the method 400 is said to apply to individual cell units within a particular SSD, while one of ordinary skill in the art will appreciate that the method 400 may be tailored for other units of storage as found in SSD devices and/or other hardware.

Method 400 begins (step 402) with the implementation of the SSD unit (e.g., cell) tracking table for accounting for write cycles of every unit in the SSD device (step 404). As a following step, the method 400 increases the size of the write cycle cell-tracking table, for each allocated additional cell (step 406). Next, for each cell included in the tracking table, a corresponding time stamp is implemented. (step 408).

In step 410, following, a per-cell write cycle-tracking information is obtained. A deduplicated cell-tracking table is then implemented, which stores a number of time deduplicated data is identified to a specific cell in the SSD device (step 412). The frequency of deduplicated write operations measured at the drive is then saved to be tracked (step 414). For each cell included in the tracking table, a corresponding time stamp is then implemented (step 416).

Moving to step 418, for unusual write patterns, such as spikes, the write patterns are detected and recorded (both highly and non-highly deduplicable data scenarios again as previously described). Deduplicated cell tracking information is then obtained (step 420). The current actual writes are then examined against prevented writes (step 422) as previously described. Any previous predictive history is also examined, and potentially in view of the examination of the actual vs. preventative writes as previously described (step 424). Finally, all of the obtained information is analyzed in view of necessary drive constants to obtain current predictive information (step 426). The method 400 then ends (step 428).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for predicting hardware lifespan by a processor device, comprising:
   for a solid state drive (SSD) device configured with data deduplication mechanisms, performing:
   obtaining trend information by comparing a write tracking table to a de-duplicated cell tracking table to determine how many new cells were allocated on the SSD device over a particular time period; and
   applying the trend information to at least one drive constant data to predict the useful remaining lifespan of the SSD drive device.

2. The method of claim 1, further including examining a prediction of the useful remaining lifespan of the SSD drive device obtained at a previous time.

3. The method of claim 2, further including comparing the previous prediction of the useful remaining lifespan of the SSD drive device against a current prediction of the SSD drive device.

4. The method of claim 1, further including predicting additional capacity for wear leveling of the SSD drive device using a salvage cell tracking operation.

5. The method of claim 2, wherein implementing the write tracking table includes performing at least one of:
   for each allocated additional cell, increasing a size of the write tracking table, and
   for each cell included in the write tracking table, implementing a corresponding time stamp.

6. The method of claim 2, wherein implementing the de-duplicated cell tracking table includes performing at least one of:
   tracking a frequency of de-duplicated write operations,
   for each de-duplicated entry to the de-duplicated cell tracking table, implementing a corresponding time stamp, and
   for an unusual write pattern, detecting spikes for data ascertained as highly de-duplicable and data ascertained as highly non de-duplicable.

7. The method of claim 4, further including, pursuant to using the salvage cell tracking operation, implementing a counter system used to track every de-duplicated cell write in the SSD device.

8. A system for predicting hardware lifespan, comprising:
   a processor that, for a solid state drive (SSD) device configured with data deduplication mechanisms, performs:
      obtains trend information by comparing a write tracking table to a de-duplicated cell tracking table to determine how many new cells were allocated on the SSD device over a particular time period; and
      applies the trend information to at least one drive constant data to predict the useful remaining lifespan of the SSD drive device.

9. The system of claim 8, wherein the processor examines a prediction of the useful remaining lifespan of the SSD drive device obtained at a previous time.

10. The system of claim 9, wherein the processor compares the previous prediction of the useful remaining lifespan of the SSD drive device against a current prediction of the SSD drive device.

11. The system of claim 8, wherein the processor predicts additional capacity for wear leveling of the SSD drive device using a salvage cell tracking operation.

12. The system of claim 9, wherein the processor implements the write tracking table by performing at least one of:
   for each allocated additional cell, increasing a size of the write tracking table, and
   for each cell included in the write tracking table, implementing a corresponding time stamp.

13. The system of claim 9, wherein the processor implements the de-duplicated cell tracking table by performing at least one of:
   tracking a frequency of de-duplicated write operations,
   for each de-duplicated entry to the de-duplicated cell tracking table, implementing a corresponding time stamp, and
   for an unusual write pattern, detecting spikes for data ascertained as highly de-duplicable and data ascertained as highly non de-duplicable.

14. The system of claim 11, wherein the processor, pursuant to using the salvage cell tracking operation, implements a counter system used to track every de-duplicated cell write in the SSD device.

15. A computer program product for predicting hardware lifespan by a processor, the computer program product comprising a non-transitory computer-readable storage medium having computer-readable program code portions stored therein, the computer-readable program code portions comprising:
   an executable portion that, for a solid state drive (SSD) device configured with data deduplication mechanisms, performs:
      obtains trend information by comparing a write tracking table to a de-duplicated cell tracking table to determine how many new cells were allocated on the SSD device over a particular time period; and
      applies the trend information to at least one drive constant data to predict the useful remaining lifespan of the SSD drive device.

16. The computer program product of claim 15, further including an executable portion that
   examines a prediction of the useful remaining lifespan of the SSD drive device obtained at a previous time.

17. The computer program product of claim 16, further including an executable portion that compares the previous prediction of the useful remaining lifespan of the SSD drive device against a current prediction of the SSD drive device.

18. The computer program product of claim 15, further including an executable portion that predicts additional capacity for wear leveling of the SSD drive device using a salvage cell tracking operation.

19. The computer program product of claim 16, further including an executable portion that implements the write tracking table by performing at least one of:
   for each allocated additional cell, increasing a size of the write tracking table, and
   for each cell included in the write tracking table, implementing a corresponding time stamp.

20. The computer program product of claim 16, further including an executable portion that implements the de-duplicated cell tracking table by performing at least one of:
   tracking a frequency of de-duplicated write operations,
   for each de-duplicated entry to the de-duplicated cell tracking table, implementing a corresponding time stamp, and
   for an unusual write pattern, detecting spikes for data ascertained as highly de-duplicable and data ascertained as highly non de-duplicable.

21. The computer program product of claim 18, further including an executable portion that, pursuant to using the salvage cell tracking operation, implements a counter system used to track every de-duplicated cell write in the SSD device.

* * * * *